(12) United States Patent
Liu et al.

(10) Patent No.: US 10,243,669 B2
(45) Date of Patent: Mar. 26, 2019

(54) OPTICAL SIGNAL RECEIVING APPARATUS

(71) Applicant: KUANG-CHI INTELLIGENT PHOTONIC TECHNOLOGY LTD., Shenzhen (CN)

(72) Inventors: Ruopeng Liu, Shenzhen (CN); Weizi Huang, Shenzhen (CN); Xin Zhang, Shenzhen (CN); Zhiwei Pan, Shenzhen (CN); Weicheng Xu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/710,830

(22) Filed: Sep. 21, 2017

(65) Prior Publication Data

US 2018/0013496 A1   Jan. 11, 2018

Related U.S. Application Data

(63) Continuation of application No. PCT/CN2016/076834, filed on Mar. 21, 2016.

(30) Foreign Application Priority Data

Mar. 25, 2015   (CN) .................... 2015 2 0171861 U
Mar. 25, 2015   (CN) .................... 2015 2 0173389 U (Continued)

(51) Int. Cl.
*H04B 10/06*   (2006.01)
*H04B 10/60*   (2013.01)
*H04B 10/116*  (2013.01)

(52) U.S. Cl.
CPC ........... *H04B 10/60* (2013.01); *H04B 10/116* (2013.01)

(58) Field of Classification Search
USPC .................................. 398/212, 202; 362/362
See application file for complete search history.

(56) References Cited

U.S. PATENT DOCUMENTS 4,796,301 A * 1/1989 Uzawa ............... H04N 1/00488
                                                          398/118
5,621,387 A * 4/1997 Phillips .................. G08B 29/10
                                                          174/520

(Continued)

FOREIGN PATENT DOCUMENTS

CN   201111663 Y    9/2008
CN   101307876 A   11/2008

(Continued)

*Primary Examiner* — David C Payne
*Assistant Examiner* — Pranesh K Barua
(74) *Attorney, Agent, or Firm* — Perkins Coie LLP

(57) ABSTRACT

The present application relates to an optical signal receiving apparatus, including a housing for accommodating a body inside the housing, where the body is provided with an optical receiver for receiving an external optical signal, and an optical-to-electrical conversion device is arranged at a central position of the optical receiver. The optical signal receiving apparatus is further provided with a lamp cup for reflecting the external optical signal to the optical-to-electrical conversion device, a light ring for indicating a light incident region, a pry-proof circuit arranged on the body, a power control circuit, and a keying circuit. The optical signal receiving apparatus of the present application can improve user experience.

19 Claims, 6 Drawing Sheets

(30) Foreign Application Priority Data

| Sep. 1, 2015 | (CN) | .......................... 2015 1 0533136 |
|---|---|---|
| Sep. 1, 2015 | (CN) | .......................... 2015 2 0674538 |
| Sep. 1, 2015 | (CN) | ..................... 2015 2 0677869 U |
| Sep. 1, 2015 | (CN) | ..................... 2015 2 0677890 U |

(56) References Cited

U.S. PATENT DOCUMENTS

| 5,625,337 | A * | 4/1997 | Medawar | B60Q 1/52 |
| | | | | 307/10.6 |
| 6,302,100 | B1 * | 10/2001 | Vandenberg | G02B 5/045 |
| | | | | 126/698 |
| 8,809,677 | B1 * | 8/2014 | Kuo | F24J 2/10 |
| | | | | 136/259 |
| 2007/0133209 | A1 * | 6/2007 | Wang | F21K 9/233 |
| | | | | 362/294 |
| 2007/0256726 | A1 * | 11/2007 | Fork | H01L 31/052 |
| | | | | 136/246 |
| 2007/0269219 | A1 * | 11/2007 | Teller | H04B 10/803 |
| | | | | 398/140 |
| 2008/0031002 | A1 * | 2/2008 | Venier | B62J 6/04 |
| | | | | 362/473 |
| 2008/0083869 | A1 * | 4/2008 | Mizuno | G01D 5/3473 |
| | | | | 250/231.13 |
| 2008/0185505 | A1 * | 8/2008 | Mizuno | G01D 5/3473 |
| | | | | 250/231.13 |
| 2008/0317406 | A1 * | 12/2008 | Santori | H04B 10/803 |
| | | | | 385/24 |
| 2010/0276267 | A1 * | 11/2010 | King | H01H 9/0271 |
| | | | | 200/303 |
| 2012/0113651 | A1 * | 5/2012 | Kuo | F21V 13/02 |
| | | | | 362/311.01 |
| 2012/0154785 | A1 * | 6/2012 | Gilliland | G01S 7/4813 |
| | | | | 356/5.01 |
| 2013/0016978 | A1 * | 1/2013 | Son | H04B 10/116 |
| | | | | 398/118 |
| 2014/0022784 | A1 * | 1/2014 | Dohn | F21V 3/02 |
| | | | | 362/235 |
| 2014/0043828 | A1 * | 2/2014 | Yokota | F21V 3/02 |
| | | | | 362/311.02 |
| 2014/0161273 | A1 * | 6/2014 | Soufan | H04M 1/19 |
| | | | | 381/73.1 |
| 2014/0192208 | A1 * | 7/2014 | Okincha | H04N 17/002 |
| | | | | 348/188 |
| 2014/0270798 | A1 * | 9/2014 | Manahan | H04B 10/116 |
| | | | | 398/130 |
| 2014/0308045 | A1 * | 10/2014 | Pederson | H04B 10/40 |
| | | | | 398/135 |
| 2014/0328599 | A1 * | 11/2014 | Pederson | H04B 10/116 |
| | | | | 398/118 |
| 2015/0070656 | A1 * | 3/2015 | Chien | G02B 27/08 |
| | | | | 353/1 |
| 2015/0132006 | A1 * | 5/2015 | Inoue | H05B 37/0263 |
| | | | | 398/118 |
| 2016/0149645 | A1 * | 5/2016 | Liu | H04B 10/40 |
| | | | | 398/135 |

FOREIGN PATENT DOCUMENTS

| CN | 202306451 U | 7/2012 |
|---|---|---|
| CN | 102620241 A | 8/2012 |
| CN | 102682485 A | 9/2012 |
| CN | 103050550 A | 4/2013 |
| CN | 203055960 U | 7/2013 |
| CN | 103234168 A | 8/2013 |
| CN | 203177037 U | 9/2013 |
| CN | 204442386 U | 7/2015 |
| CN | 204442388 U | 7/2015 |
| CN | 204901666 U | 12/2015 |
| CN | 204948082 U | 1/2016 |
| CN | 204993358 U | 1/2016 |
| WO | 2014202162 A1 | 12/2014 |

* cited by examiner

OPTICAL SIGNAL RECEIVING APPARATUS

CROSS REFERENCE TO RELATED APPLICATIONS

This application is a continuation of PCT/CN2016/076834 filed on Mar. 21, 2016, which claims priority to Chinese patent application No. 201520171861.6 of Mar. 25, 2015; Chinese patent application No. 201520173389.X of Mar. 25, 2015; Chinese patent application No. 201510553136.X of Sep. 1, 2015; Chinese patent application No. 201520677890.X of Sep. 1, 2015; Chinese patent application No. 201520677869.X of Sep. 1, 2015; and Chinese patent application No. 201520674538.0 of Sep. 1, 2015; all of which are incorporated herein by reference.

TECHNICAL FIELD

The present application relates to the optical communication field, and in particular, to an optical signal receiving apparatus.

BACKGROUND

In visible light communication, visible light is used to transmit data. For example, flashing of an LED light source at a high frequency is used for communication. Characteristics thereof are that the visible light communication can be applied to any communication protocol or any work environment, with good controllability. The visible light communication also features good confidentiality, so that communication data is not easily stolen and therefore has high security.

However, a prior-art optical signal receiving apparatus provides poor user experience. The prior-art optical signal receiving apparatus directly receives an optical signal. When there is light incident to a photodiode, the photodiode converts the optical signal to a digital signal, and transmits the digital signal to a signal circuit coupled to the photodiode. A light receiving area is only an area on a surface of the photodiode that can receive light. With a small effective area, it is difficult for an optical signal of an external transmit end to accurately fall on the photosensitive area, reducing the utilization rate of the optical signal. In addition, no reminder is set on a receiving area of the prior-art optical signal receiving apparatus; as a result, a user cannot accurately distinguish the effective area for receiving an optical signal, posing obstacles in use.

In the prior art, relatively poor power source management is implemented for an internal circuit of the optical signal receiving apparatus, and problems such as erroneously triggered wake-up and relatively large power consumption are likely to occur. This also leads to poor user experience.

SUMMARY

To address the problems existing in a prior-art optical signal receiving apparatus, the present application provides a new-type optical communication receiving apparatus, to improve user experience.

The present application relates to an optical signal receiving apparatus, including a housing for accommodating a body inside the housing, where the body is provided with an optical receiver for receiving an external optical signal, and an optical-to-electrical conversion device is arranged at a central position of the optical receiver.

Preferably, the optical receiver further includes a lamp cup, configured to reflect the external optical signal to the optical-to-electrical conversion device.

Preferably, the lamp cup has a funnel-shaped structure.

Preferably, a light incident region of the optical-to-electrical conversion device is located at a central position of a funnel-shaped necking of the lamp cup.

Preferably, a lampshade whose surface has a convex lens structure is further arranged at a position, corresponding to the lamp cup, on the housing.

Preferably, the optical-to-electrical conversion device is a photodiode, a phototriode, a photoresistor, or a photocell.

Preferably, an inner surface of the lamp cup is coated with a silver mirror layer for reflecting light.

Preferably, the body further includes an upper cover, and an electrical component connected to the optical receiver is accommodated inside the upper cover.

Preferably, the outside of the lampshade has a raised convex lens structure, and a bottom surface inside the lampshade has a planer structure.

Preferably, a second window for mounting the lampshade is arranged at a position, corresponding to the lamp cup, on a surface of the housing.

Preferably, a surface of the upper cover is provided with a first window that allows the optical receiver to pass through.

Preferably, the bottom of the lampshade extends around, to form a skirt matching an edge of an inner surface of the second window and used to secure the lampshade.

Preferably, a convex lens structure part of the lampshade protrudes from the surface of the housing.

Preferably, an end face of a wide-mouth end of the funnel-shaped lamp cup is arranged flush with the surface of the housing.

Preferably, the optical receiver is provided with a light ring around the optical receiver to indicate a light incident region, and the light ring is composed of multiple LED lamps.

Preferably, a light guide ring for guiding light, emitted from an LED lamp, to the external is further arranged between the optical receiver and the light ring.

Preferably, a light transmission gear structure is further arranged between the LED lamp and an emitting surface, where the structure is used for projecting the light emitted from the LED lamp to a reflecting surface after the light is diverged.

Preferably, a bottom of the optical receiver and the LED lamps are arranged on a PCB board inside the body, and the optical receiver extends from a surface of the PCB board toward the housing.

Preferably, the housing further includes a lampshade for conducting light, and the lampshade covers exactly over the light guide ring.

Preferably, a tooth surface of the light transmission gear is arranged opposite to the LED lamp.

Preferably, the light guide ring is arranged around a periphery of the optical receiver, and a bottom of the light guide ring is provided with a reflecting surface for reflecting, in an extension direction of the optical receiver, light emitted by the LED lamp.

Preferably, a pry-proof circuit is arranged inside the body, and the pry-proof circuit includes a detection circuit and an alarm circuit that are electrically connected to each other, where: the detection circuit includes a processor, a trigger switch, and a detection power supply, where the processor and the detection power supply form the detection circuit through the trigger switch; the alarm circuit includes an alarm device, a working power supply, and a switch unit, where one electrode of the working power supply is electrically connected to one terminal of the alarm device through the switch unit, the other terminal of the alarm device is electrically connected to the other electrode of the working power supply, and the processor is electrically connected to the switch unit; when the trigger switch is disconnected, the processor detects a trigger switch OFF signal and sends an ON signal to the switch unit, so that the switch unit is connected, and the alarm device is activated; and when the trigger switch is disconnected, the processor detects a trigger switch ON signal, the ON signal input to the switch unit is interrupted, the switch unit is cut off, and the alarm device is turned off.

Preferably, the switch unit is a triode, one terminal of the alarm device is electrically connected to a base electrode of the triode, the other terminal of the alarm device is electrically connected to the negative electrode of the working power supply, and the positive electrode of the working power supply is electrically connected to an emitting electrode of the triode; and a collecting electrode of the triode is grounded.

Preferably, the trigger switch is a pry-proof spring arranged on an inner surface of the housing, and two pins of the pry-proof spring are electrically connected to two terminals of the detection circuit, respectively.

Preferably, when the trigger switch is disconnected, the processor detects a low level signal, and the processor sends an ON signal to the base electrode of the triode, so that the triode is connected; and when the trigger switch is disconnected, the processor detects a high level signal, and a voltage signal input by the processor to the base electrode of the triode is interrupted, so that the triode is in a disconnected state.

Preferably, a protective resistor is connected in series in each of the detection circuit and the alarm circuit.

Preferably, the switch unit is a field effect transistor.

Preferably, the body includes an upper cover, the pry-proof circuit is arranged inside the upper cover, and a surface of the upper cover is provided with a through hole that allows the pry-proof spring to pass through.

Preferably, the pry-proof spring passes through the through hole, and the two pins of the pry-proof spring are electrically connected to the two terminals of the detection circuit, respectively.

Preferably, the inner surface of the housing is further provided with a bump for securing the pry-proof spring.

Preferably, the optical signal receiving apparatus further includes:

a main control circuit, connected to an optical receiver and configured to process an optical signal received by the optical receiver;

a keying circuit, connected to the main control circuit, where the main control circuit is further configured to respond to an action of the keying circuit, generate a high level, and output the high level to a control signal input end; and a power control circuit, where a power end of the power control circuit is connected to an output end of a power source, and the power control circuit is configured to respond to the high level of the control signal input end, and connect the output end of the power source to a power input end of the main control circuit.

Preferably, the power control circuit includes:

a first switch tube, where a control electrode of the first switch tube is connected to the control signal input end, a first electrode and a second electrode are respectively connected to a node and the ground, and the first switch tube is connected in response to the high level of the control signal input end, and is cut off in response to a low level of the control signal input end; and a second switch tube, where a control electrode of the second switch tube is connected to the node, a first electrode and a second electrode are respectively connected to a power end and a power input end of the optical signal receiving apparatus, and the second switch tube is connected in response to a low level of the node, and is cut off in response to a high level of the node.

Preferably, the power control circuit further includes a first resistor, a second resistor, and a third resistor, where the first resistor is connected between the control electrode of the first switch tube and the control signal input end, the second resistor is connected between the node and the control electrode of the second switch tube, and the third resistor is connected between the node and the power end.

Preferably, resistance values of the first resistor, the second resistor, and the third resistor are 1 KΩ, 10Ω, and 100 KΩ, respectively.

Preferably, the first switch tube is a triode, and the second switch tube is a field effect transistor.

Preferably, the keying circuit is a 12-bit keying circuit, and the main control circuit is configured to respond to an action of a key of at least one bit of the 12-bit keying circuit, generate a high level, and output the high level to the control signal input end.

Preferably, a key of at least one bit is set to # key.

Preferably, the optical signal receiving apparatus further includes:

a main control circuit, connected to an optical receiver and configured to process an optical signal received by the optical receiver;

a keying circuit, connected to the main control circuit, where the main control circuit is further configured to respond to an action of the keying circuit, generate a high level, and output the high level to a control signal input end; and a wake-up circuit, connected to a power input end of the main control circuit and configured to wake up the main control circuit; and a sliding closure, arranged on the housing and configured to control connection and disconnection of a switch in the wake-up circuit by sliding in a preset direction.

Preferably, the wake-up circuit includes:

a resistor, where two ends of the resistor are respectively connected to a power end and a node;

a capacitor, where two ends of the capacitor are respectively connected to the ground and the node; and a switch whose connection and disconnection are controlled in a physical means, where two ends of the switch are respectively connected to the ground and the node, and the node is configured to connect to a power input end of a light receiving terminal.

Preferably, in the wake-up circuit, the switch is a microswitch, or the switch is a reed switch.

Preferably, the sliding closure is provided with a bump for triggering the microswitch, or the sliding closure is provided with a magnet for triggering the reed switch.

The optical signal receiving apparatus provided in the present application has the following beneficial effects: An optical-to-electrical conversion device can receive a stronger optical signal when a mechanism design is used in which a lamp cup has a funnel-shaped structure and the optical-to-electrical conversion device is arranged at a central position of the lamp cup; a lampshade in a convex lens structure is arranged on a housing, so that light incident to the lampshade converges to the lamp cup, thereby increasing an angle of light reception, greatly improving the efficiency of the optical signal, and increasing a transmission distance of the optical signal; an optical receiver is arranged at the center of a light ring, so that an optical signal receiving area is clear, and optical signal transmission is accurate and rapid; color changes of LED lamps are used to indicate different working states, and a light transmission gear structure is arranged between the LED and a light guide ring, so that light emitted by the light ring is more soft; and a wake-up function of the optical signal reception apparatus is optimized by setting a power control circuit and a keying circuit.

DESCRIPTION OF EMBODIMENTS

The present application provides an optical signal receiving apparatus. To make the objectives, technical solutions, and effects of the present application clearer, the following further describes the present application in detail. It should be understood that the described embodiments are merely used to explain the present application, rather than to limit the present application.

Embodiment 1

Figure 1:
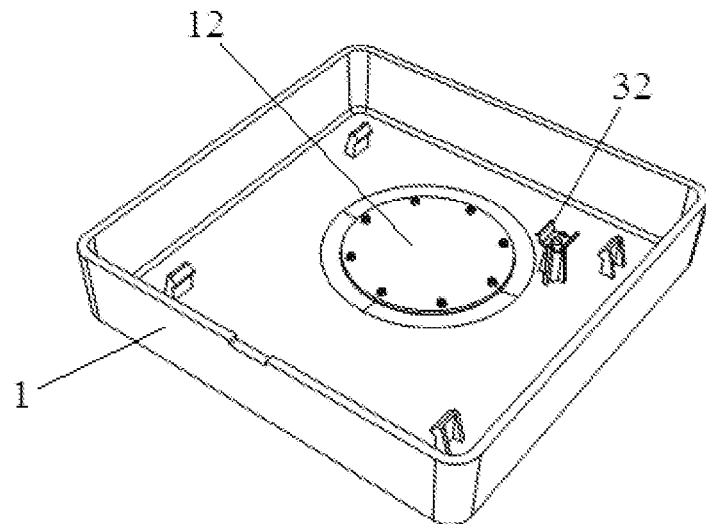
FIG. 1 is a schematic structural diagram of a housing according to an embodiment of the present application.
Figure 2:
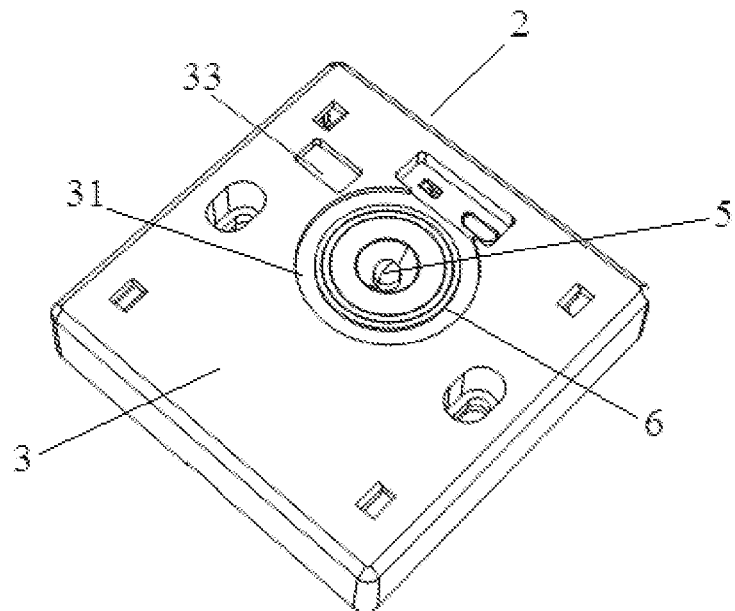
FIG. 2 is a schematic structural diagram of a body according to an embodiment of the present application.
Figure 3:
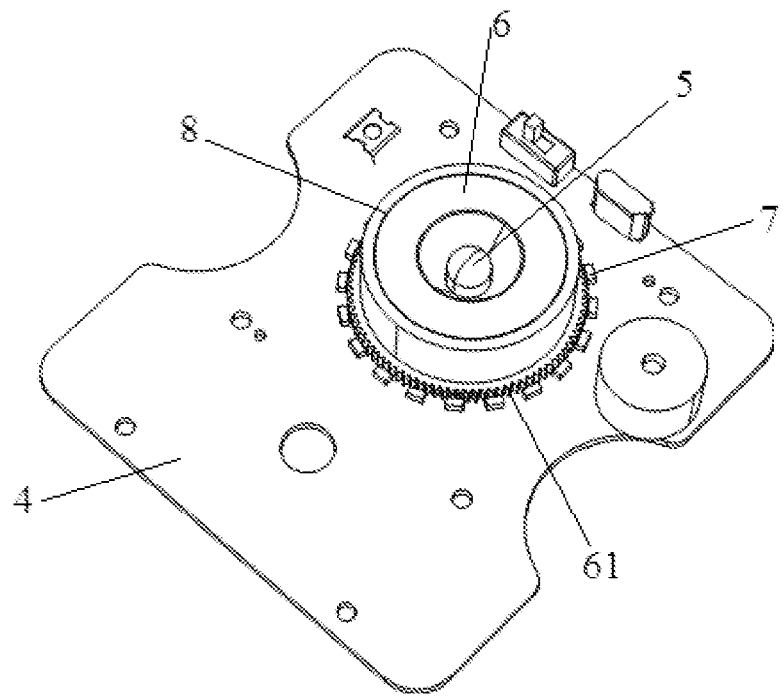
FIG. 3 is a schematic structural diagram of a PCB board according to an embodiment of the present application.

As shown in FIG. 1 and FIG. 2, an optical signal receiving apparatus provided in the present application includes a housing 1, a body 2 accommodated inside the housing 1, an upper cover 3 arranged on the body 2 for allowing an optical receiver to pass through, and a PCB board 4 provided with the optical receiver (as shown in FIG. 3), where a surface of the upper cover 3 is provided with a first window 31 that allows the optical receiver to pass through. An optical-to-electrical conversion device for sensing light is arranged at a central position of the optical receiver, a lamp cup 6 having a funnel-shaped inner surface is arranged around a periphery of the optical receiver, a photosensitive area of the optical-to-electrical conversion device is located at the center of a funnel-shaped necking of the lamp cup 6, a funnel-shaped wide-mouth end of the lamp cup 6 directly faces the external housing 1, and an end face of the funnel-shaped wide-mouth end of the lamp cup 6 is arranged flush with a surface of the housing 1. The optical-to-electrical conversion device may be one of a photodiode, a phototriode, a photoresistor, or a photocell, and a photodiode 5 is preferably used in this embodiment.

As shown in FIG. 1 to FIG. 3, the upper cover 3 is a square housing with six faces and with an opening at a bottom, a direction of the opening of the upper cover faces the PCB board 4, a bottom away from the PCB board 4 is provided with a first window 31 that allows the optical receiver to pass through, and the upper cover 3 is disposed over the PCB 4. The optical receiver pierces through the first window 31. In this way, the upper cover 3 protects the PCB board 4 and a connection link thereof. A non-photosensitive side of the photodiode is connected to a digital signal conversion circuit on the PCB board 4, so as to convert an optical signal to a corresponding digital electrical signal.

Figure 4:
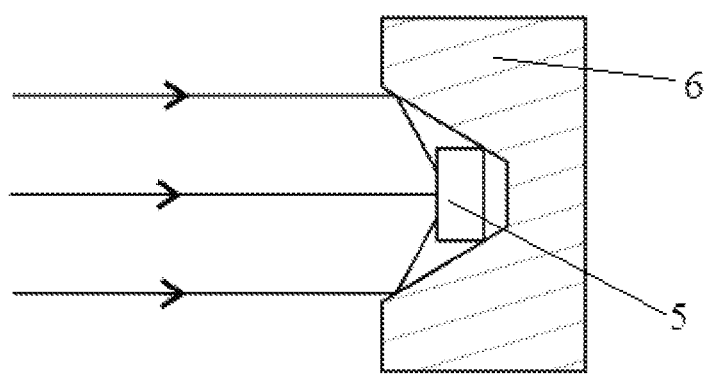
FIG. 4 is a schematic structural diagram of a lamp cup according to an embodiment of the present application.

As shown in FIG. 4, in the design, the photodiode 5 is arranged at the center of the lamp cup 6, and light incident to the lamp cup 6 is finally concentrated on a surface of the photodiode 5 after undergoing multiple times of refraction; therefore, there is no light directly shinning upon the surface of the photodiode 5, and all light incident to an inner surface of the lamp cup 6 can converge on the photosensitive area of the photodiode 5 at the center of a bottom after being reflected. In this way, the photodiode 5 receives an optical signal with a larger area and stronger signal intensity, thereby improving the transmission quality of the optical signal.

Further, the photodiode 5 is located at the bottom of the lamp cup 6. A top of the lamp cup 6 is a funnel-shaped wide mouth end, and the bottom is a tapered end. To improve a reflection effect of the lamp cup 6, the inner surface of the lamp cup 6 is subject to a silver mirror treatment, for example, a silver film is electroplated on the surface of the lamp cup 6.

Figure 5:
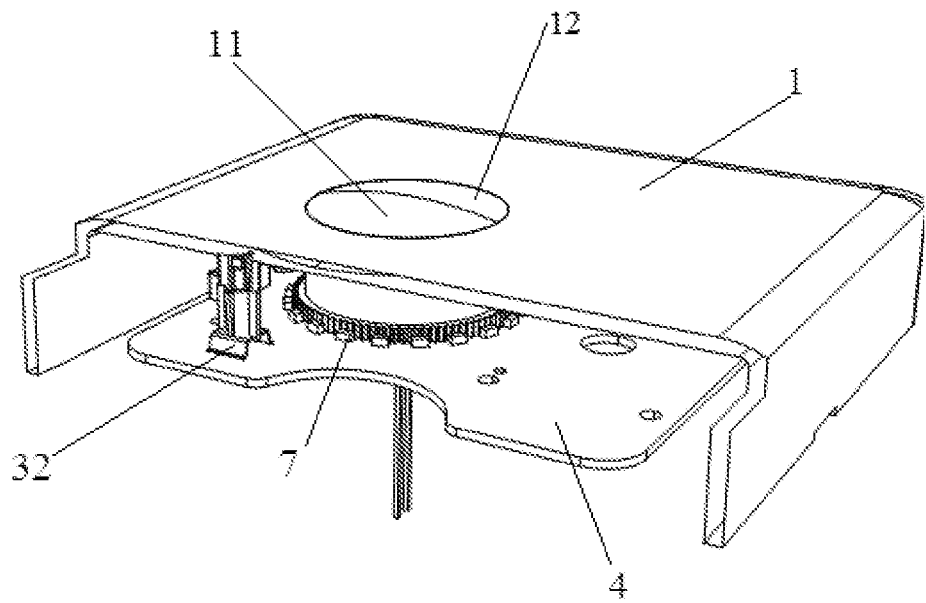
FIG. 5 is an assembly effect diagram of an optical signal receiving apparatus according to an embodiment of the present application.
Figure 6:
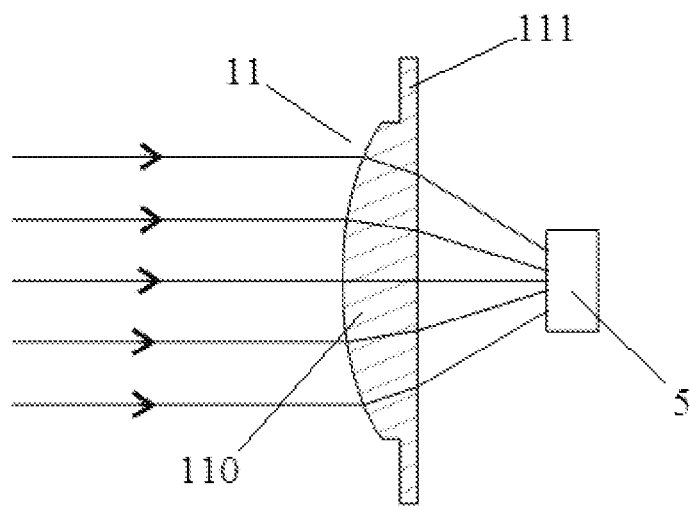
FIG. 6 is a schematic structural diagram of a lampshade according to an embodiment of the present application.

As shown in FIG. 5 and FIG. 6, to further increase a photosensitive area of the optical receiver, a convex lens lampshade 11 is arranged on the housing 1. Light projected from different angles is converged by the lampshade 11 and is incident to the inner surface of the lamp cup 6, so that the photodiode senses the light. A bottom of the lampshade 11 is flat, and the center protrudes outwardly to form a convex lens structure 110, and a skirt 111 for mounting and securing the lampshade is arranged between the raised outer side and the bottom surface of the lampshade 11. Specifically, the upper surface of the housing 1 is provided with a second window 12 corresponding to the opening of the lamp cup 6, the lampshade 11 passes through the second window 12 from the inside of the housing 1, and the skirt 111 is attached to an edge of the inner surface of the second window 12, limiting displacement of the lampshade 11 to the outside. Then, the skirt 111 is fixed to an edge of the second window 12. In this embodiment, holes are punched around the skirt 111 and the second window 12, and then the two are fixed by a thermoplastics column. Alternatively, the skirt 111 may be fixed to the edge of the second window 12 in another manner, such as glue bonding.

Embodiment 2

This embodiment is an improved solution on the basis of the previous embodiment. In this embodiment, as shown in FIG. 3, to clarify a visual recognition feature of an optical signal receiving area, the PCB board 4 is provided with a light ring around the periphery of the optical receiver, where the light ring is composed of a circle of LED lamps 7, and the optical receiver is placed at a center position of the light ring. In this way, a visual recognition effect of the optical signal receiving area is achieved, so that an optical signal transmitter can accurately and rapidly send an optical signal to the optical signal receiving area.

Preferably, to allow the light ring to indicate other information such as an operating state of the optical signal receiving apparatus while indicating the optical signal receiving area, the LED lamps 7 in the light ring may be arranged in a regular pattern, so as to exhibit different light-emitting states, thereby indicating information corresponding to the light-emitting states. In this embodiment, the LED lamps 7 in the light ring are arranged according to different colors, and the light ring shows different colors to indicate different operating states. For example, the light ring is blue, indicating an initial state after installation; the light ring turns cyan from blue when a correct signal is received for the first time after installation; the light ring blinks blue for three seconds when a cell ID of the optical signal is not correct; the light ring is green when an ID emitted by a light key is a valid ID and an unlock permission is obtained; and the blue light ring keeps blinking when a receiver shell is pried without permission. An implementation process is as follows: A blue LED lamp and a green LED lamp may be arranged alternately. When LED lamps 7 of a single color are controlled to illuminate alone, the entire light ring exhibits a corresponding monochromatic ring. When LED lamps 7 of two colors are controlled to illuminate simultaneously, the light ring displays cyan, which is exhibited when blue and green mingle. Another different indicating method may also be used, for example, the LED lamps 7 go out clockwise or anticlockwise. These alternatives are not exhaustively described herein.

Figure 7:
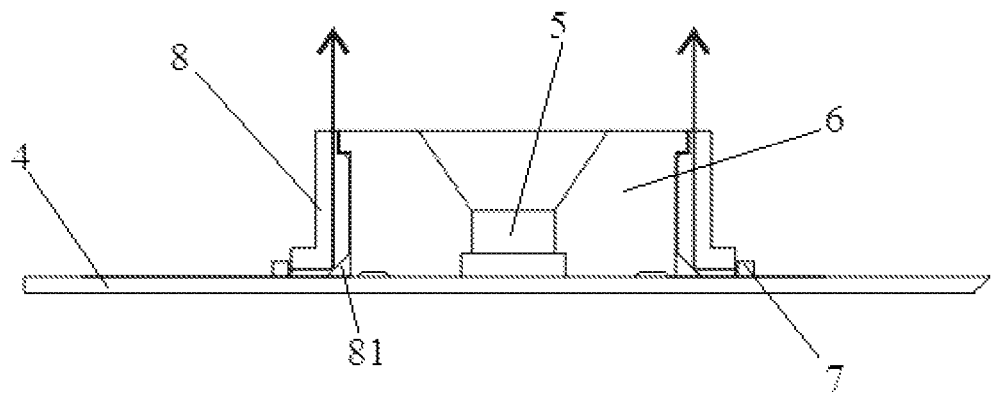
FIG. 7 is an internal structural diagram of an LED light ring according to an embodiment of the present application.

Further, as shown in FIG. 3 and FIG. 7, a light guide ring 8 is arranged around the lamp cup 6 in the periphery of the lamp cup 6, to allow light, emitted from the LED lamps 7, to diverge outward to form a light ring. A reflecting surface 81 having a surface at an angle of 45° is arranged, at the bottom of the light guide ring 8, at a same level with the LED lamps 7. The reflecting surface 81 is continuously distributed as a circle around the optical receiver. Light emitted horizontally from the LED lamps 7 is deflected by 90° after being reflected by the reflecting surface 81 (as shown by an arrow in FIG. 7), and goes upward from the bottom of the light guide ring 8, that is, in a direction perpendicular to the surface of the upper cover 3, so that a visual light ring is formed around the optical receiver.

Preferably, as shown in FIG. 3, to make light emitted from the light ring softer and avoid a dazzling problem due to concentrated light, a light transmission gear structure 61 is arranged at a bottom of the optical receiver, that is, outside the lamp cup 6. The light transmission gear structure 61 is arranged between the LED lamps 7 and the reflecting surface 81. A tooth surface of the light transmission gear is arranged opposite to the LED lamps, so that light emitted from the LED lamps 7 is evenly dispersed and then is incident to the reflecting surface 81, achieving an effected that the reflected light is evenly distributed and soft.

Embodiment 3

Figure 8:
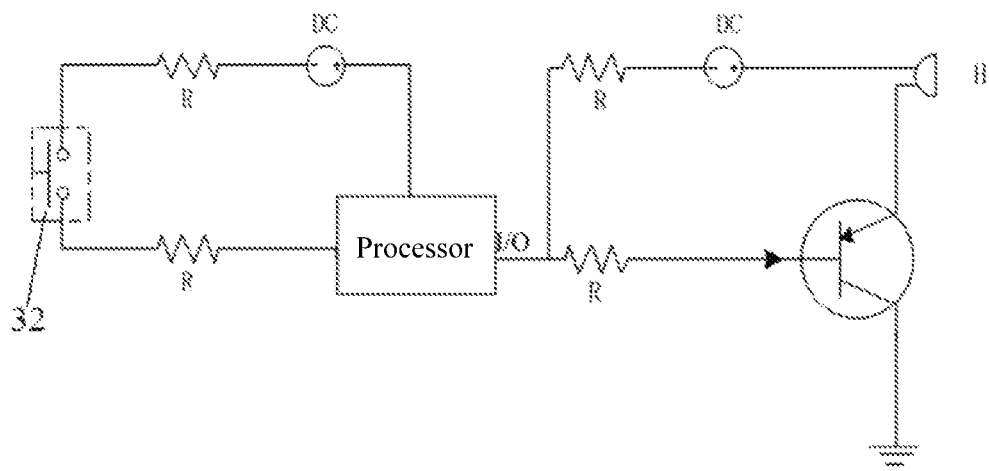
FIG. 8 is an equivalent circuit diagram of a pry-proof circuit according to an embodiment of the present application.

According to the description of the foregoing embodiments, a pry-proof circuit is further arranged inside the body of the optical signal receiving apparatus provided in this embodiment. As shown in FIG. 8, the pry-proof circuit includes a detection circuit and a hummer alarm circuit that are electrically connected to each other. The detection circuit includes a processor, a trigger switch, and a detection power supply, where the processor and the detection power supply form the detection circuit through the trigger switch. The hummer alarm circuit includes a hummer (H), a working power supply, and a switch unit. One electrode of the working power supply is electrically connected to one terminal of the hummer through the switch unit, the other terminal of the hummer is electrically connected to the other electrode of the working power supply, and the processor is electrically connected to the switch unit. When the trigger switch is disconnected, the processor detects a low level signal, and sends an ON signal to the switch unit, so that the switch unit is connected, and the hummer is activated. When the trigger switch is disconnected, the processor detects a high level signal, the ON signal input to the switch unit is interrupted, and the switch unit is cut off and the hummer is turned off.

Further, as shown in FIG. 1, the trigger switch is a pry-proof spring 32 secured on the inner surface of the housing 1, and the pry spring 32 is provided with pins, on two sides, opposite to the upper cover 3. A pry-proof circuit corresponding to the pry-proof spring 32 is arranged on the PCB board 4 inside the body 2. When the housing 1 and the body 2 are engaged with each other, the two pins of the pry-proof spring 32 are in electrical contact with the terminals of the pry-proof circuit, and the pry-proof circuit is not triggered. When the optical signal receiving apparatus is destroyed by external force and the housing 1 is separated from the body 2, the two pins of the pry-proof spring 32 are disconnected from the terminals of the pry-proof circuit, and the pry-proof circuit is triggered.

Further, as shown in FIG. 8, in this embodiment, the switch unit is a triode. In the hummer alarm circuit, the positive electrode of the working power supply is electrically connected to one terminal of the hummer, the other terminal of the hummer is electrically connected to an emitting electrode of the triode, the negative electrode of the working power supply is electrically connected to a base electrode of the triode, the base electrode of the triode is electrically connected to the processor, and a collecting electrode of the triode is grounded. When the trigger switch formed by the pry-proof spring 32 is disconnected, that is, when the pry-proof spring 32 is disconnected from the two terminals of the hummer circuit, the processor detects a low level signal and sends a low level ON signal to the transistor, so that the switch unit is connected, and the hummer is activated. When the pry-proof spring 32 are in contact with the two terminals of the pry-proof circuit, that is, the trigger switch is disconnected, the processor detects a high level signal, and a high-level cut-off signal input to the triode is interrupted, that is, the low level ON signal is interrupted, so that the triode is cut off and the hummer is turned off. As shown in FIG. 5 and FIG. 8, when the housing 1 is engaged with the body 2, the processor detects a high level signal, the triode is in a disconnected state, and the hummer alarm circuit is disconnected; or when the housing 1 is separated from the body 2, the pry-proof spring 32 is disconnected with the terminals of the circuit, the processor detects a low level signal, the triode is in a connected state, and the hummer alarm circuit forms a loop, triggering the hummer to give an alarm. In this way, the pry-proof spring 32 forms a trigger switch structure through which an operating state of the hummer is controlled, thereby acting as a pry-proof alarm. Certainly, the switch unit is not limited to a triode, and may be a field effect transistor, provided that a circuit is set in a manner in which when the processor detects a low level signal, the field effect transistor is connected, or when a processor detects a high level signal, the field effect transistor is cut off. Specifically, if the switch unit is a field effect transistor (not shown in the figure), the positive electrode of the working power supply is connected to one terminal of the hummer, the other terminal of the hummer is connected to a source electrode of the field effect transistor, a drain electrode of the field effect transistor is grounded, and the negative electrode of the working power supply is connected to the base electrode of the field effect transistor.

Preferably, as shown in FIG. 8, to ensure circuit safety, at least one protective resistor is connected in series in each of the detection circuit and the hummer alarm circuit. Specifically, a protective resistor R is connected in series between the positive electrode of the detection power supply and one terminal of the trigger switch, a protective resistor R is also connected in series between the other terminal of the trigger switch and the processor, and the negative electrode of the detection power supply is connected to an internal wire of the processor. Correspondingly, in the hummer alarm circuit, a resistor R is connected in series between the negative electrode of the working power supply and the base electrode of the triode, and a protective resistor R is connected in series between the processor and the base electrode of the triode. Likewise, for the sake of safety, the triode used in this embodiment is preferably a triode transistor having a low power of less than 1 W, such as an S9012-type triode transistor, so that a current flowing through the pry-proof circuit is relatively small.

Furthermore, as shown in FIG. 2, a through hole 33 that allows the pins to pass through is provided on the surface of the upper cover 3 at positions corresponding to the pins of the pry-proof spring 32. After the housing 1 is engaged with the body 2, the two pins of the pry-proof spring 32 pass through the through hole 33 on the upper cover 3 and come in electrical contact with the terminals of the pry-proof circuit, respectively.

In the optical signal receiving apparatus provided in the present application, a lampshade and a lamp cup structure are arranged, greatly improving use efficiency of an optical signal, and increasing a transmission distance of the optical signal; an optical receiver is arranged at the center of a light ring, so that an optical signal receiving area is clear, and optical signal transmission is accurate and rapid; color changes of LED lamps are used to indicate different working states, and a light transmission gear structure is arranged between the LED and a light guide ring, so that light emitted by the light ring is softer; and a pry-proof circuit is used to detect whether a pry-proof spring secured on the housing is moved, to give a pry-proof alarm. Therefore, the apparatus is cost-effective, independent on environmental factors, barely restricted, and immune to the external environment.

In addition to the pry-proof circuit, the optical signal receiving apparatus of the present application is further provided with another circuit to realize effects such as wake-up optimization and power supply control optimization. A function of each circuit can be achieved by setting a circuit board on the body. For example, the optical signal receiving apparatus of the present application is further provided with an internal main control circuit. The main control circuit is connected to the optical receiver and configured to process an optical signal received by the optical receiver, for example, to decode or decrypt data obtained through optical-to-electrical conversion by the optical receiver, to obtain restored original information. Certainly, the main control circuit may also be used for processing and controlling data of another function in the optical signal receiving apparatus, for example, controlling rotation of a motor on the optical signal receiving apparatus, maintaining password information in the optical signal receiving apparatus (such as adding or deleting a password), recognizing a password input by a user, giving an alarm, controlling a color and blinking frequency of an indicator, controlling the hummer circuit, and storing an unlock record.

In some implementations, the optical signal receiving apparatus may further include a power control circuit and a keying circuit that are electrically connected to the main control circuit. The keying circuit is connected to the main control circuit. The main control circuit is further configured to respond to an action of the keying circuit, generate a high level, and output the high level to a control signal input end. A power end of the power control circuit is connected to an output end of a power source, and the power control circuit is configured to respond to a high level when a key of the keying circuit, such as #, is pressed, and connect the output end of the power source to a power input end of the main control circuit.

Figure 9:
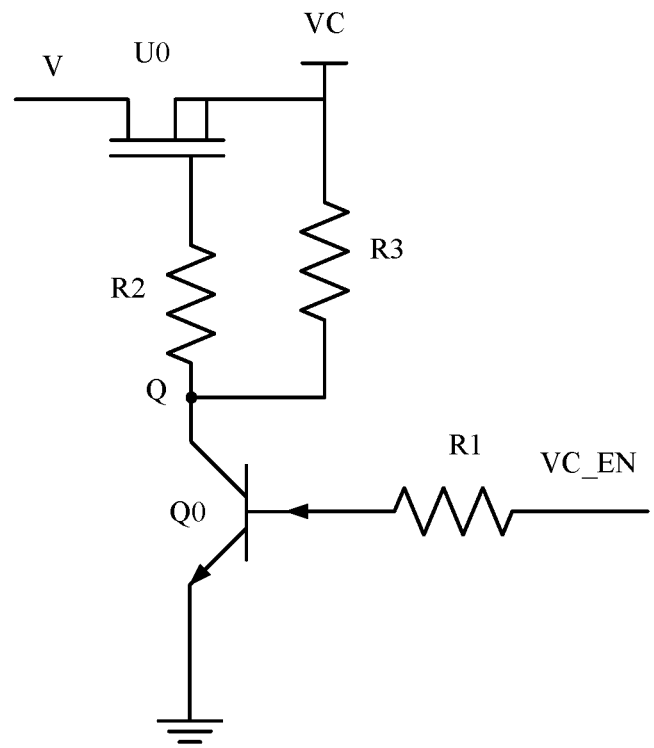
FIG. 9 is a circuit diagram of a power control circuit according to an embodiment of the present application.

As shown in FIG. 9, FIG. 9 shows a circuit diagram of a power control circuit. A power end of the power control circuit is connected to an output end of a power source, and the power control circuit is configured to respond to a keying circuit. In one aspect, the power control circuit ensures that the detection circuit and the hummer alarm circuit in the foregoing embodiment operate continuously. In another aspect, the power control circuit is also used to implement a wake-up function of an optical signal receiver. The power control circuit may be controlled by the keying circuit after point connection is made between the power control circuit and the keying circuit.

Specifically, the power control circuit includes a first switch tube Q0 and a second switch tube U0.

A control electrode of the first switch tube Q0 is connected to a control signal input end VC_EN, a first electrode and a second electrode are respectively connected to a node Q and the ground, and the first switch tube Q0 is connected in response to a high level of the control signal input end VC_EN, and is cut off in response to a low level of the control signal input end VC_EN.

A control electrode of the second switch tube U0 is connected to the node Q, a first electrode and a second electrode are respectively connected to a power end VC and a power input end V of the optical signal receiving apparatus, and the second switch tube U0 is connected in response to a low level of the node Q, and is cut off in response to a high level of the node Q.

The control signal input end VC_EN is set to a low level by using the keying circuit, and the power input end V is disconnected from the power end VC through the first switch tube Q0 and the second switch tube U0 in the power control circuit; then the optical signal receiving apparatus goes to a dormant state. When the optical signal receiving apparatus needs to be woken up, the control signal input end VC_EN is set to a high level by using the keying circuit, and the power input end V is connected to the power end VC through the first switch tube Q0 and the second switch tube U0 in the power control circuit; then the optical signal receiving apparatus is woken up.

To improve performance of the power control circuit, in this embodiment, the power control circuit further includes a first resistor R1, a second resistor R2, and a third resistor R3. The first resistor R1 is connected between the control electrode of the first switch tube Q0 and the control signal input end VC_EN, the second resistor R2 is connected between the node Q and the control electrode of the second switch tube U0, and the third resistor R3 is connected between the node Q and the power end VC. Specifically, resistance values of the first resistor R1, the second resistor R2, and the third resistor R3 are 1 KΩ, 10Ω and 100 KΩ, respectively. Certainly, in another embodiment, a specific structural design of a power control circuit 60 may vary depending on actual requirements.

In this embodiment, the first switch tube Q0 is a triode, and the second switch tube U0 is a field effect transistor. Correspondingly, the control electrode of the first switch tube Q0 is a base electrode, the first electrode is a collecting electrode, and the second electrode is an emitting electrode. The first electrode of the second switch tube U0 is a source electrode, the second electrode is a drain electrode, and the control electrode is a gate electrode.

Figure 10:
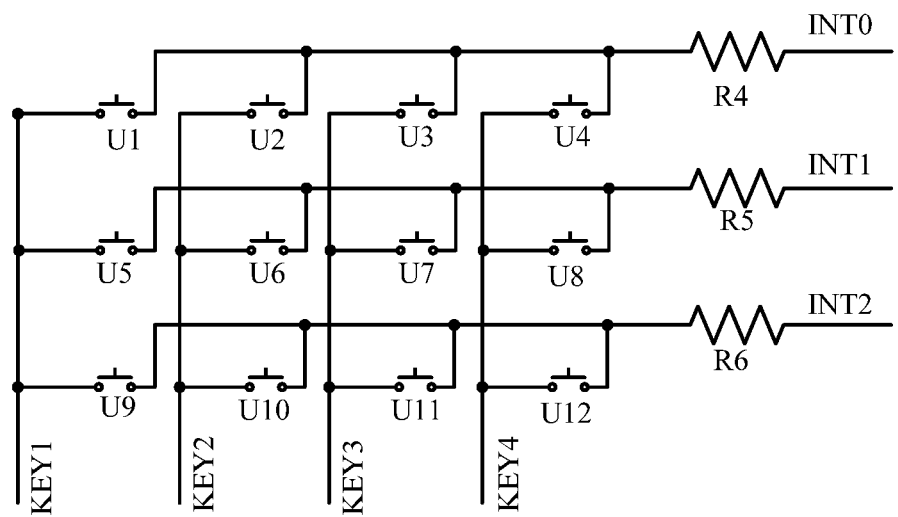
FIG. 10 is a circuit diagram of a keying circuit according to an embodiment of the present application.

As shown in FIG. 10, FIG. 10 shows a circuit diagram of a keying circuit according to an embodiment of the present application. The keying circuit is configured to control an optical signal receiving apparatus by using a keyboard when the optical signal receiving apparatus is electrically connected to the keyboard. In this embodiment, the keying circuit is a 12-bit keying circuit, and 12 keys are U1 to U12, arranged in a 3*4 manner. INT0 to INT2 are interrupt pins in a single-chip microcomputer, KEY1 to KEY4 are connected to one end of each key, and R4 to R6 are three current limiting resistors in the keying circuit.

When the # key in the 12-bit keying circuit is pressed, the single-chip microcomputer outputs a high level to the control signal input end. For example, in the 12-bit keying circuit, there are 10 number keys, one "*" key, and one "#" key. When the optical signal receiving apparatus is in a dormant state, that is, in quiescent operation, the control signal input end VC_EN is at a low level. When the "#" key is pressed, the single-chip microcomputer sends a high level to the control signal input end VC_EN by using a pin, to wake up the optical signal receiving apparatus, and put the optical signal receiving apparatus into service.

In other embodiments, the keys of the keying circuit may be designed according to actual needs.

In this embodiment, the main control circuit is implemented by using a single-chip microcomputer. The keying circuit is connected to an IO port with an interrupt function in the single-chip microcomputer, and the control signal input end is connected to an ordinary IO port in the control signal input end. When the "#" key in the keyboard is pressed, the single-chip microcomputer suspends a program action being processed, and processes only a program action when the "#" key is pressed, that is, waking up the single-chip microcomputer, so that the single-chip microcomputer exits the dormant state. The single-chip microcomputer sends a high level by using the IO port. A 1K resistor is connected in series between the IO port and the control signal input end, so that the power source controls a circuit action.

When the main control circuit is in a dormant state, the power source may still provide required power for the main control circuit during the dormant state by using another circuit connection.

The optical signal receiving apparatus provided in this embodiment may be mounted on an access control system. A single-chip microcomputer generates a high level according to an action of the key circuit and sends the high level to a control signal input end, and then the optical signal receiving apparatus switches between a dormant state and a working state in combination with a control action of the first switch tube and the second switch tube in the power control circuit, to ensure that the optical signal receiving apparatus is in a dormant state when the apparatus does not need to work, thereby reducing power consumption. In addition, in comparison with the prior art, a state of the optical signal receiving apparatus is controlled by using the power control circuit provided in this embodiment, which is more reliable, thereby resolving a problem that the optical signal receiving apparatus is prone to be easily triggered by mistake due to external interference.

The optical signal receiving apparatus may be an intelligent optical lock, an optical payment device, or the like.

The foregoing power control circuit and keying circuit are particularly suitable for waking-up an optical signal receiving apparatus equipped with a keyboard. In some cases in which keyboard typing is not required, a wake-up circuit in the following embodiment may be used to implement switchover between a dormant state and a working state.

In this embodiment, the main control circuit may be woken up without using a keyboard and a key input circuit. Instead, a sliding closure is arranged on the housing for controlling connection and disconnection of a switch in the wake-up circuit by sliding in a preset direction. The wake-up circuit is connected to a power input end of the main control circuit and is configured to wake up the main control circuit.

Figure 11:
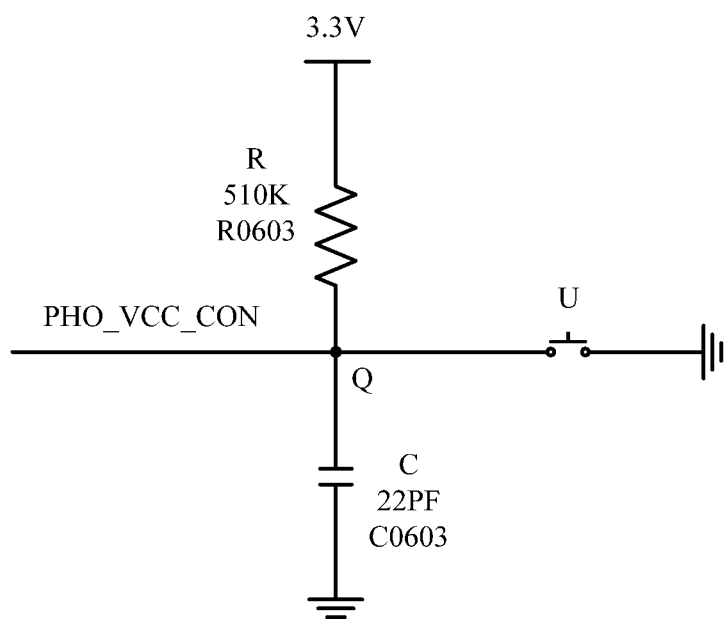
FIG. 11 is a circuit diagram of a wake-up circuit according to an embodiment of the present application.

Referring to FIG. 11, in this embodiment, the wake-up circuit includes a resistor R, a capacitor C, and a switch U.

Two ends of the resistor R are respectively connected to a power end and a node Q.

Two ends of the capacitor C are respectively connected to the ground and the node Q.

Connection and disconnection of the switch U are controlled in a physical means, and two ends of the switch U are respectively connected to the ground and the node Q. The node Q is configured to connect to a power input end PHO_VCC_CON of the main control circuit of the optical signal receiving apparatus. In this embodiment, the physical means refers to a sliding movement of the sliding closure in the preset direction.

An operating principle of the wake-up circuit is as follows: One end of the resistor R is connected to a power end, for example, an output end of a voltage stabilizing circuit of the optical signal receiving apparatus. A voltage at the power end, that is, an operating voltage of the optical signal receiving apparatus, may be 3.3 V. When the switch U is connected, a voltage of the node Q is a ground voltage, the power input end PHO_VCC_CON of the main control circuit of the optical signal receiving apparatus is at a low level, and the main control circuit is in a dormant state. When the switch U is disconnected, the node Q is at a high level due to an effect of a pull-up resistor R, the power input end PHO_VCC_CON of the main control circuit of the optical signal receiving apparatus is at a high level, and the main control circuit is woken up.

To adapt to a structure and the operating principle of the optical signal receiving apparatus, the resistor R may be a chip resistor (R0603) with resistance of 510 KΩ, and the capacitor C may be a chip capacitor (C0603) with capacity of 22 PF. Certainly, in other embodiments, types of the resistor and the capacitor may be selected according to actual requirements, and a resistance value of the resistor and a capacity of the capacitor may be adjusted.

When the main control circuit is in a dormant state, the power source may still provide required power for the main control circuit during the dormant state by using another circuit connection.

In this embodiment, the switch U is a microswitch. The microswitch has a tiny contact interval and a fast mechanism, and a drive rod is used to control connection and disconnection of the microswitch. In this embodiment, the sliding closure functions as a drive rod. For example, when the sliding closure is slid downward, the microswitch is driven to be connected, so that the optical signal receiving apparatus is in a dormant state. When the optical signal receiving apparatus needs to be woken up, the sliding closure is slid upward, and the microswitch is driven to be disconnected, so as to wake up the optical signal receiving apparatus.

To better drive the microswitch, the sliding closure is further provided with a bump for triggering the microswitch, to more accurately control connection and disconnection of the microswitch. In a specific embodiment, a specific mechanical structure of the sliding closure may be designed according to actual situations provided that the sliding closure is capable of controlling connection and disconnection of the microswitch.

Alternatively, the switch U can use other switches. For example, the switch U is a reed switch. The reed switch has two magnetizable reeds overlapping at an endpoint, and the two reeds are separated by only a few microns. Before operation, the reeds are not in contact, and the reed switch is in a disconnected state. When different polarities are generated in a vicinity of the endpoint of the two reeds due to an applied magnetic field, the two reeds with different polarities are attracted to each other and are closed, so that the reed switch is in a connected state. The reed switch may be made into a switching component of very small volume size featuring a rapid switching speed and high reliability.

In this embodiment, the sliding closure is provided with a magnet for triggering the reed switch and magnetizing the two reeds of the reed switch. When the sliding closure is slid downward, the magnet switches on the reed switch, so that a light receiving terminal is in a dormant state. When the light receiving terminal needs to be woken up, the sliding closure is slid upward, and the magnet switches off the reed switch, so as to wake up the light receiving terminal.

In a specific embodiment, a specific mechanical structure of the sliding closure may be designed according to actual situations provided that the sliding closure is capable of controlling connection and disconnection of the reed switch.

When the main control circuit is in a dormant state, the power source may still provide required power for the main control circuit during the dormant state by using another circuit connection.

The foregoing content further describes the present application in combination with specific embodiments. It should not be deemed that specific implementations of the present application are limited to these descriptions. Those skilled in the art may still make certain modifications and substitutions without departing from the concept of the present application, and all such modifications and variations fall within the protection scope of the appended claims.

What is claimed is:

1. An optical signal receiving apparatus, comprising a housing, a body set inside the housing, wherein the body is provided with an optical receiver for receiving an external optical signal, and an optical-to-electrical conversion device is arranged at a central position of the optical receiver;

a pry-proof circuit is arranged inside the body and comprises a detection circuit and an alarm circuit that are electrically connected to each other, the detection circuit comprises a processor, a trigger switch, and a detection power supply, the processor and the detection power supply form the detection circuit through the trigger switch; the alarm circuit comprises an alarm device, a working power supply, and a switch unit, one electrode of the working power supply is electrically connected to one terminal of the alarm device through the switch unit, the other terminal of the alarm device is electrically connected to the other electrode of the working power supply, and the processor is electrically connected to the switch unit; when the trigger switch is disconnected, the processor detects a trigger switch OFF signal and sends an ON signal to the switch unit, so that the switch unit is connected and the alarm device is activated; and when the trigger switch is connected, the processor detects a trigger switch ON signal, the ON signal input to the switch unit is interrupted, the switch unit is cut off, and the alarm device is turned off.

2. The optical signal receiving apparatus according to claim 1, wherein the optical receiver further comprises a lamp cup, configured to reflect the external optical signal to the optical-to-electrical conversion device, the lamp cup has a funnel-shaped structure.

3. The optical signal receiving apparatus according to claim 2, wherein a light incident region of the optical-to-electrical conversion device is located at a central position of a funnel-shaped necking of the lamp cup.

4. The optical signal receiving apparatus according to claim 2, wherein a lampshade whose surface has a convex lens structure is further arranged at a position, corresponding to the lamp cup, on the housing.

5. The optical signal receiving apparatus according to claim 2, wherein the body further comprises an upper cover, and an electrical component connected to the optical receiver is accommodated inside the upper cover.

6. The optical signal receiving apparatus according to claim 2, wherein an outside of a lampshade has a raised convex lens structure, and a bottom surface inside the lampshade has a planer structure.

7. The optical signal receiving apparatus according to claim 5, wherein a surface of the upper cover is provided with a first window that allows the optical receiver to pass through.

8. The optical signal receiving apparatus according to claim 4, wherein a second window for mounting the lampshade is arranged at a position, corresponding to the lamp cup, on a surface of the housing.

9. The optical signal receiving apparatus according to claim 1, wherein the optical receiver is provided with a light ring around the optical receiver to indicate a light incident region, and the light ring is composed of multiple LED lamps, a light guide ring for guiding light, emitted from an LED lamp, to the external is further arranged between the optical receiver and the light ring.

10. The optical signal receiving apparatus according to claim 1, wherein the optical receiver is provided with a light ring around the optical receiver to indicate a light incident region, and the light ring is composed of multiple LED lamps, a light transmission gear structure is further arranged between the LED lamps and a reflecting surface, wherein the structure is used for projecting the light, emitted from the LED lamp, to a reflecting surface after the light is diverged.

11. The optical signal receiving apparatus according to claim 1, wherein the optical receiver is provided with a light ring around the optical receiver to indicate a light incident region, and the light ring is composed of multiple LED lamps, both a bottom of the optical receiver and the LED lamps are arranged on a PCB board inside the body, and the optical receiver extends from a surface of the PCB board toward the housing.

12. The optical signal receiving apparatus according to claim 9, wherein the housing further comprises a lampshade for conducting light, and the lampshade covers exactly over the light guide ring.

13. The optical signal receiving apparatus according to claim 1, wherein the switch unit is a triode, one terminal of the alarm device is electrically connected to a base electrode of the triode, the other terminal of the alarm device is electrically connected to the positive electrode of the working power supply, and the positive electrode of the working power supply is electrically connected to an emitting electrode of the triode; and a collecting electrode of the triode is grounded.

14. The optical signal receiving apparatus according to claim 1, wherein the trigger switch is a pry-proof spring arranged on an inner surface of the housing, and two pins of the pry-proof spring are electrically connected to two terminals of the detection circuit, respectively; when the trigger switch is disconnected, the processor detects a low level signal, and the processor sends an ON signal to the base electrode of the triode, so that the triode is connected; and when the trigger switch is connected, the processor detects a high level signal, and a voltage signal input by the processor to the base electrode of the triode is interrupted, so that the triode is in a disconnected state.

15. The optical signal receiving apparatus according to claim 14, wherein the body comprises an upper cover, the pry-proof circuit is arranged inside the upper cover, and a surface of the upper cover is provided with a through hole that allows the pry-proof spring to pass through; the pry-proof spring passes through the through hole, and the two pins of the pry-proof spring are electrically connected to the two terminals of the detection circuit, respectively; the inner surface of the housing is further provided with a bump for securing the pry-proof spring.

16. The optical signal receiving apparatus according to claim 1, further comprising:
  a main control circuit, connected to the optical receiver and configured to process an optical signal received by the optical receiver;
  a keying circuit, connected to the main control circuit, wherein the main control circuit is further configured to respond to an action of the keying circuit, generate a high level, and output the high level to a control signal input end of the main control circuit; and
  a power control circuit, wherein a power end of the power control circuit is connected to an output end of a power source, and the power control circuit is configured to respond to the high level of the control signal input end, and connect the output end of the power source to a power input end of the main control circuit;
  the power control circuit comprises a first switch tube and a second switch tube, a control electrode of the first switch tube is connected to a control signal input end, a first electrode and a second electrode are respectively connected to a node and the ground, a control electrode of the second switch tube is connected to the node, a first electrode and a second electrode are respectively connected to a power end and a power input end of the optical signal receiving apparatus.

17. The optical signal receiving apparatus according to claim 16, wherein the power control circuit comprises:
  a first switch tube, wherein a control electrode of the first switch tube is connected to the control signal input end, a first electrode and a second electrode are respectively connected to a node and the ground, and the first switch tube is connected in response to the high level of the control signal input end, and is cut off in response to a low level of the control signal input end; and
  a second switch tube, wherein a control electrode of the second switch tube is connected to the node, a first electrode and a second electrode are respectively connected to a power end and a power input end of the optical signal receiving apparatus, and the second switch tube is connected in response to a low level of the node, and is cut off in response to a high level of the node.

18. The optical signal receiving apparatus according to claim 17, wherein the power control circuit further comprises a first resistor, a second resistor, and a third resistor, and the first resistor is connected between the control electrode of the first switch tube and the control signal input end, the second resistor is connected between the node and the control electrode of the second switch tube, and the third resistor is connected between the node and the power end.

19. The optical signal receiving apparatus according to claim 1, further comprising:
  a main control circuit, connected to an optical receiver and configured to process an optical signal received by the optical receiver;
  a keying circuit, connected to the main control circuit, wherein the main control circuit is further configured to respond to an action of the keying circuit, generate a high level, and output the high level to a control signal input end;
  a wake-up circuit, connected to a power input end of the main control circuit and configured to wake up the main control circuit; and
  a sliding closure, arranged on the housing and configured to control connection and disconnection of a switch in the wake-up circuit by sliding in a preset direction;
  the wake-up circuit comprises:
  a resistor, wherein two ends of the resistor are respectively connected to a power end and a node;
  a capacitor, wherein two ends of the capacitor are respectively connected to the ground and the node; and
  wherein two ends of the switch are respectively connected to the ground and the node, and the node is configured to connect to a power input end of the main control circuit.

* * * * *